United States Patent
Yeh et al.

(10) Patent No.: US 9,488,475 B2
(45) Date of Patent: Nov. 8, 2016

(54) SYSTEM AND PROCESSING APPARATUS FOR MEASURING SURFACE ACOUSTIC WAVE SENSITIVE AREA SIZE AND METHOD THEREOF

(71) Applicant: EGALAX_EMPIA TECHNOLOGY INC., Taipei (TW)

(72) Inventors: Shang-Tai Yeh, Taipei (TW); Teng-Wei Hsieh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 487 days.

(21) Appl. No.: 14/106,978

(22) Filed: Dec. 16, 2013

(65) Prior Publication Data

US 2014/0169137 A1    Jun. 19, 2014

(30) Foreign Application Priority Data

Dec. 14, 2012 (TW) .............................. 101147309 A (51) Int. Cl.
 G01S 3/80 (2006.01)
 G01B 17/00 (2006.01)
 G01S 3/808 (2006.01)

(52) U.S. Cl.
 CPC ............. *G01B 17/00* (2013.01); *G01S 3/8083* (2013.01)

(58) Field of Classification Search
 USPC ........................................................ 367/129
 See application file for complete search history.

(56) References Cited

U.S. PATENT DOCUMENTS

| | | | | |
|---|---|---|---|---|
| 4,893,286 A * | 1/1990 | Cobb | | 367/87 |
| 4,899,845 A * | 2/1990 | Bosco et al. | | 181/122 |
| 5,546,946 A * | 8/1996 | Souquet | | 600/459 |
| 5,577,506 A * | 11/1996 | Dias | | 600/459 |
| 6,594,201 B2 * | 7/2003 | Barnard et al. | | 367/125 |
| 7,000,474 B2 * | 2/2006 | Kent | | 73/579 |
| 7,768,875 B2 * | 8/2010 | Iida et al. | | 367/131 |
| 2004/0168516 A1 * | 9/2004 | Kent | | 73/579 |
| 2008/0031092 A1 * | 2/2008 | Iida et al. | | 367/88 |
| 2010/0305444 A1 * | 12/2010 | Fujii et al. | | 600/443 |
| 2012/0004552 A1 * | 1/2012 | Kamiyama | | 600/443 |
| 2013/0272097 A1 * | 10/2013 | Kim et al. | | 367/129 |
| 2013/0281855 A1 * | 10/2013 | Baba et al. | | 600/441 |

* cited by examiner

*Primary Examiner* — James Hulka (74) *Attorney, Agent, or Firm* — WPAT, PC; Justin King (57) ABSTRACT

A measuring method of touch sensitive area size of a SAW sensor module is provided. The SAW sensor module comprises a substrate configured for propagating SAW, a first transmitter and a first receiver corresponding to a first axis, a second transmitter and a second receiver corresponding to a second axis. The SAWs emitted by the first transmitter at least pass through a first initial distance xi, propagate through a second axis length y after reflected by a first SAW reflecting bar, and enter the first receiver after reflected by a second SAW reflecting bar. The SAWs emitted by the second transmitter at least pass through a second initial distance yi, propagate through a first axis length x after reflected by a third SAW reflecting bar, and enter the second receiver after reflected by a fourth SAW reflecting bar.

38 Claims, 7 Drawing Sheets

SYSTEM AND PROCESSING APPARATUS FOR MEASURING SURFACE ACOUSTIC WAVE SENSITIVE AREA SIZE AND METHOD THEREOF

CROSS REFERENCE TO RELATED APPLICATIONS

This application claims priority under 35 U.S.C 119 to Taiwan patent application, TW 101147309, filed on Dec. 14, 2012, the disclosure of which is incorporated herein by reference.

BACKGROUND OF THE INVENTION

1. Field of the Invention

The present invention relates to surface acoustic wave (SAW) touch sensitive technology, and more particularly, to apparatus and method for determining SAW touch sensitive area size.

2. Description of the Prior Art

Touch screen is an important human-machine interface of modern electronic product. It is widely adopted in various consumer electronics, such as smartphone, tablet computer, notebook computer, and etc. Touch screen can comprise but not limit to the following types: resistive, matrix resistive, capacitive, projected capacitive, electromagnetic sensing, infra-red sensing, and in-cell. The present invention relates to surface acoustic wave (SAW) touch sensitive technology, especially related to apparatus and method for determining SAW touch area size.

Usually, a touch screen comprises a display module and a sensor module stacked on the display module. User may use one part of human body such as finger or stylus to touch or approximate the sensor module. A processing device of the touch screen receives sensing information from the sensor module, accordingly. The working principle of SAW touch sensitive technology relies on the propagation of acoustic wave on the surface of object. In case another object touches the surface, the acoustic wave propagation is disrupted. The disruptive event is detected and used to determine the coordinates of touch.

The object providing surface mentioned above is usually a glass substrate such that user can see the underlying display module though the transparent glass substrate. The SAW is propagated on the surface of the glass substrate. Since the propagation speed on the surface of the glass substrate is constant, it is possible to calculate the coordinates where the object touches the surface according to the signal change measured and the constant wave propagation speed. In other words, the processing device coupled to the sensor module has to know parameters of SAW touch panel in advanced. Thus, the coordinate values can be derived accordingly.

Usually, one system vendor has more than one brand customer. Each brand customer may order more than one type of product. Each product may feature different sizes. For example, one brand may sell several All-In-One computers covering every aspect of market. They may comprise 10 to 12 inch light weight computers, 17 to 19 inch mainstream computers, and 20 inch high level computers. No matter their sizes, these products featuring different sizes of touch screen usually use a common processing device in considerations of design, purchase, manufacturing, inventory, and maintenance. The manufacture vendor of this common processing device is usually different to the system vendor and the brands. As mentioned above, the processing device coupled to different sized SAW sensor modules must be configured in order to connect these sensor modules.

From the view point of commerce, if the manufacture vendor of the processing device can provide a product which is capable of automatically detecting the size of SAW sensor module, the configuration step can be omitted accordingly. Thus, the manufacture sequence, cost, and time are also reduced as a result. Naturally, it enhances the competence of the processing device which is capable of automatic detecting the size of SAW sensor module. There is impossible to delay system integration due to configuration errors. Hence, there is a need of processing device and method for automatically detecting the size of SAW sensor module in the market in order to reduce the tool, cost, and time for parameter configuration.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In one embodiment, a measuring method of touch sensitive area size of a surface acoustic wave (SAW) sensor module is provided. The SAW sensor module comprises a substrate configured for propagating SAW, a first transmitter and a first receiver corresponding to a first axis, a second transmitter and a second receiver corresponding to a second axis. The SAWs emitted by the first transmitter at least pass through a first initial distance xi, propagate through a second axis length y after reflected by a first SAW reflecting bar, and enter the first receiver after reflected by a second SAW reflecting bar. The SAWs emitted by the second transmitter at least pass through a second initial distance yi, propagate through a first axis length x after reflected by a third SAW reflecting bar, and enter the second receiver after reflected by a fourth SAW reflecting bar. The measuring method comprising: controlling the first transmitter for emitting SAWs; calculating a first timing t1 when the first receiver firstly receives SAWs emitted from the first transmitter; calculating a third timing t3 when the first receiver lastly receives SAWs emitted from the first transmitter; controlling the second transmitter for emitting SAWs; calculating a fourth timing t4 when the second receiver firstly receives SAWs emitted from the second transmitter; calculating a sixth timing t6 when the second receiver lastly receives SAWs emitted from the second transmitter; calculating the first axis length x according to the velocity of SAW v, the first timing t1, and the third timing t3; and calculating the second axis length y according to the velocity of SAW v, the fourth timing t4, and the sixth timing t6.

In another embodiment, a surface acoustic wave (SAW) touch sensitive system for measuring touch sensitive area size is provided. The SAW touch sensitive system comprises a SAW sensor module and a processing apparatus for controlling the SAW sensor module. The SAW sensor module comprises a substrate configured for propagating SAW, a first transmitter and a first receiver corresponding to a first axis, a second transmitter and a second receiver corresponding to a second axis. The SAWs emitted by the first transmitter at least pass through a first initial distance xi, propagate through a second axis length y after reflected by a first SAW reflecting bar, and enter the first receiver after reflected by a second SAW reflecting bar. The SAWs emitted by the second transmitter at least pass through a second initial distance yi, propagate through a first axis length x after reflected by a third SAW reflecting bar, and enter the second receiver after reflected by a fourth SAW reflecting bar. The processing apparatus, coupled to the first transmitter, the first receiver, the second transmitter, and the second receiver, is configured to perform the following steps: controlling the first transmitter for emitting SAWs; calculating a first timing t1 when the first receiver firstly receives SAWs emitted from the first transmitter; calculating a third timing t3 when the first receiver lastly receives SAWs emitted from the first transmitter; controlling the second transmitter for emitting SAWs; calculating a fourth timing t4 when the second receiver firstly receives SAWs emitted from the second transmitter; calculating a sixth timing t6 when the second receiver lastly receives SAWs emitted from the second transmitter; calculating the first axis length x according to the velocity of SAW v, the first timing t1, and the third timing t3; and calculating the second axis length y according to the velocity of SAW v, the fourth timing t4, and the sixth timing t6.

In an alternative embodiment, a processing apparatus for measuring size of a touch sensitive area of a surface acoustic wave sensor module is provided. The SAW sensor module comprises a substrate configured for propagating SAW, a first transmitter and a first receiver corresponding to a first axis, a second transmitter and a second receiver corresponding to a second axis. The SAWs emitted by the first transmitter at least pass through a first initial distance xi, propagate through a second axis length y after reflected by a first SAW reflecting bar, and enter the first receiver after reflected by a second SAW reflecting bar. The SAWs emitted by the second transmitter at least pass through a second initial distance yi, propagate through a first axis length x after reflected by a third SAW reflecting bar, and enter the second receiver after reflected by a fourth SAW reflecting bar. The processing apparatus, coupled to the first transmitter, the first receiver, the second transmitter, and the second receiver, is configured to perform the following steps: controlling the first transmitter for emitting SAWs; calculating a first timing t1 when the first receiver firstly receives SAWs emitted from the first transmitter; calculating a third timing t3 when the first receiver lastly receives SAWs emitted from the first transmitter; controlling the second transmitter for emitting SAWs; calculating a fourth timing t4 when the second receiver firstly receives SAWs emitted from the second transmitter; calculating a sixth timing t6 when the second receiver lastly receives SAWs emitted from the second transmitter; calculating the first axis length x according to the velocity of SAW v, the first timing t1, and the third timing t3; and calculating the second axis length y according to the velocity of SAW v, the fourth timing t4, and the sixth timing t6.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1:
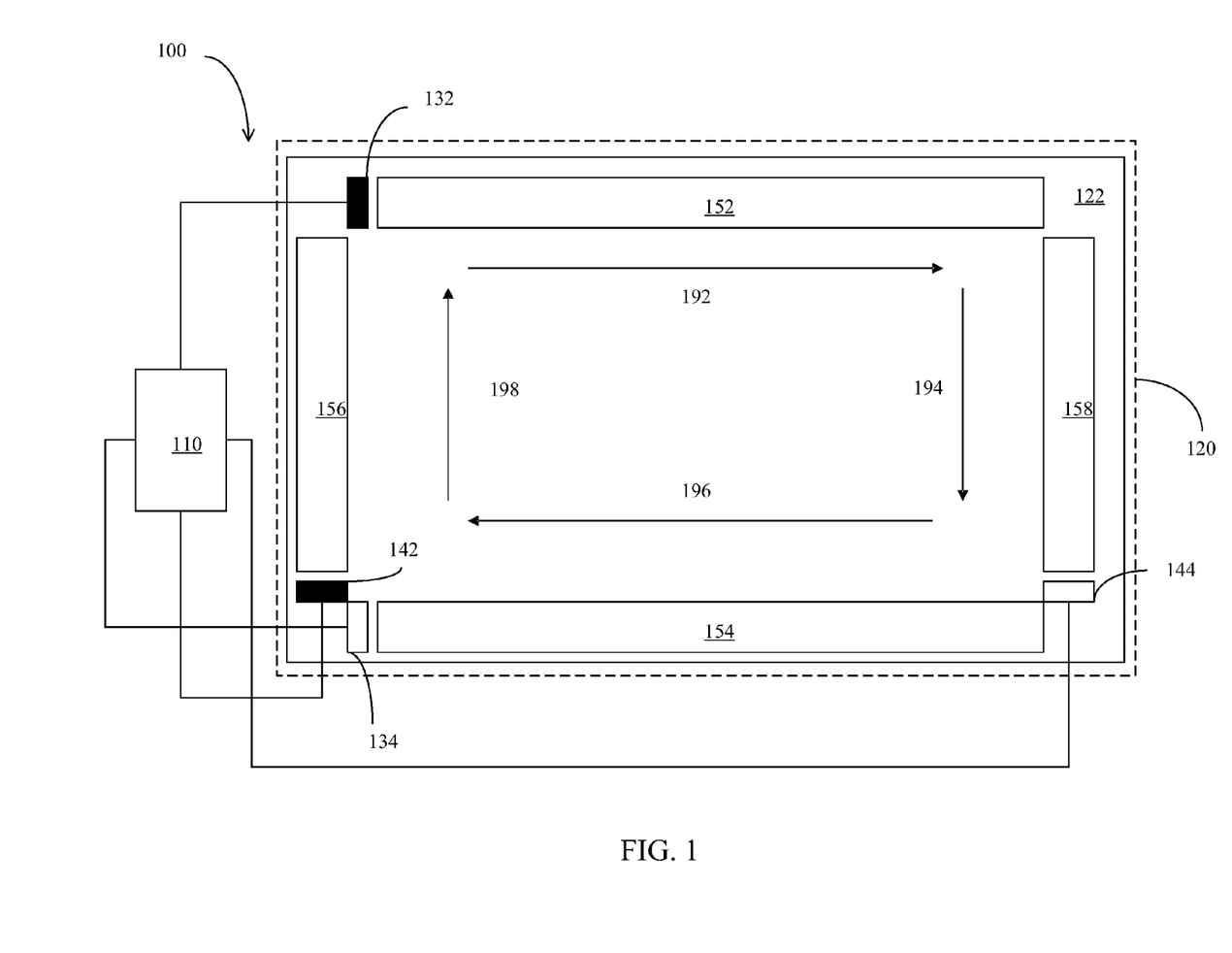
FIG. 1 is a schematic block diagram of a SAW touch sensitive system in accordance with an embodiment of the present invention.

Please refer to FIG. 1, which is a schematic block diagram of a SAW touch sensitive system 100 in accordance with an embodiment of the present invention. The SAW touch sensitive system 100 comprises a processing apparatus 110 and a SAW sensor module 120 controlled by the processing apparatus 110.

The SAW sensor module 120 comprises a substrate 122. And the following components are located on the substrate 122: a first transmitter 132, a second transmitter 142, a first receiver 134, a second receiver 144, and four acoustic wave reflecting bars 152, 154, 156, and 158. The first transmitter 132 corresponding to the first receiver 134 which is configured to measure a vertical signal or so-called Y-axis signal on the substrate 122. The second transmitter 142 corresponding to the second receiver 144 which is configured to measure a horizontal signal or so-called X-axis signal on the substrate 122.

People ordinary skilled in the art can understand the embodiment shown in FIG. 1 is just one example of the present invention. It is not used to limit the positions of the transmitters 132 and 142 as well as the receivers 134 and 144. As long as using two pairs of transmitter and receiver to measure the touch sensitive area, the present invention can be applied to the implementations.

When surface acoustic waves sent by the first transmitter 132 along the direction 192, they are propagated along the bar 152 with the X-axis. Meanwhile, the structure of bar 152 is configured to reflect the energy of the surface acoustic waves. It is designed to reflect the waves along the Y-axis direction 194 which is perpendicular to the direction 192. Hence, acoustic waves are reflected from the whole length of the acoustic wave reflecting bar 152 toward the direction 194 and arrived gradually to the acoustic wave reflecting bar 154. The reflecting faces of the bar 154 are configured to reflect waves from the direction 194 toward the direction 196 along the bar 154. Eventually, the reflected waves are arrived to the first receiver 134. The direction 194 is perpendicular to the direction 196. Thus, the directions 196 and 192 are opposite.

In a similar way, when surface acoustic waves sent from the second transmitter 142 along the direction 196, they are reflected by the acoustic wave reflecting bar 156 and propagated toward the Y-axis direction 196. Meanwhile, the structure of the bar 156 is configured to reflect the energy of the surface acoustic waves. It is designed to reflect the waves along the X-axis direction 192 which is perpendicular to the direction 196. Hence, acoustic waves are reflected from the whole length of the acoustic wave reflecting bar 156 toward the direction 192 and arrived gradually to eh acoustic wave reflecting bar 158. The reflecting faces of the bar 158 are configured to reflect waves from the direction 192 toward the direction 194 along the bar 158. Eventually, the reflected waves are arrived to the second receiver 144. The direction 192 is perpendicular to the direction 194. Thus, the directions 196 and 194 are opposite.

In the fore-mentioned descriptions, in case an object touches the substrate 122 and locates in-between where the surface acoustic waves propagating across the substrate 122 along the directions 192 and 194, the first receiver 134 and the second receiver 144 are aware that interference to the propagation of surface acoustic waves, respectively. Hence, the location of touch could be calculated accordingly. As a result, the potential interference area is the touch sensitive area of the SAW sensor module 120.

People ordinary skilled in the art can understand that components on the substrate 122 including the transmitters 132 and 142 as well as the receivers 134 and 144 and the acoustic wave reflecting bars 152-158 are usually encapsulated to prevent damage from foreign objects.

The substrate 122 exposed from the product encapsulation is the touch sensitive area of the SAW sensor module 120. The X-axis length of the touch sensitive area is corresponding to the lengths of the acoustic wave reflecting bars 152 and 154. Similarly, the Y-axis length of the touch sensitive area is corresponding to the lengths of the acoustic wave reflecting bars 156 and 158. People ordinary skilled in the art can understand that the lengths of the bars 152 and 154 are the same and the lengths of the bars 156 and 158 are also the same for the conveniences of production and calculation.

The SAW sensor module 120 is controlled by the processing apparatus 110. More specifically, the processing apparatus 110 is coupled to the transmitters 132 and 142 as well as the receivers 134 and 144. In case electrical signals sent from the processing apparatus 110 to the transmitters 132 and 142, the transmitters 132 and 142 convert the electrical energy to surface acoustic waves. Reversely, in case the energy of surface acoustic wave is received, the receivers 134 and 144 convert the energy of surface acoustic wave to electrical energy. Therefore the processing apparatus 110 can measure the arriving times and the amplitudes of the surface acoustic waves.

Already mentioned in the last paragraphs of the prior art, the processing apparatus 110 is supposed to control SAW sensor modules 120 featuring different sizes. Hence, in an embodiment of the present invention, the processing apparatus 110 can automatically detect the size of touch sensitive area of SAW sensor modules 120.

Figure 2:
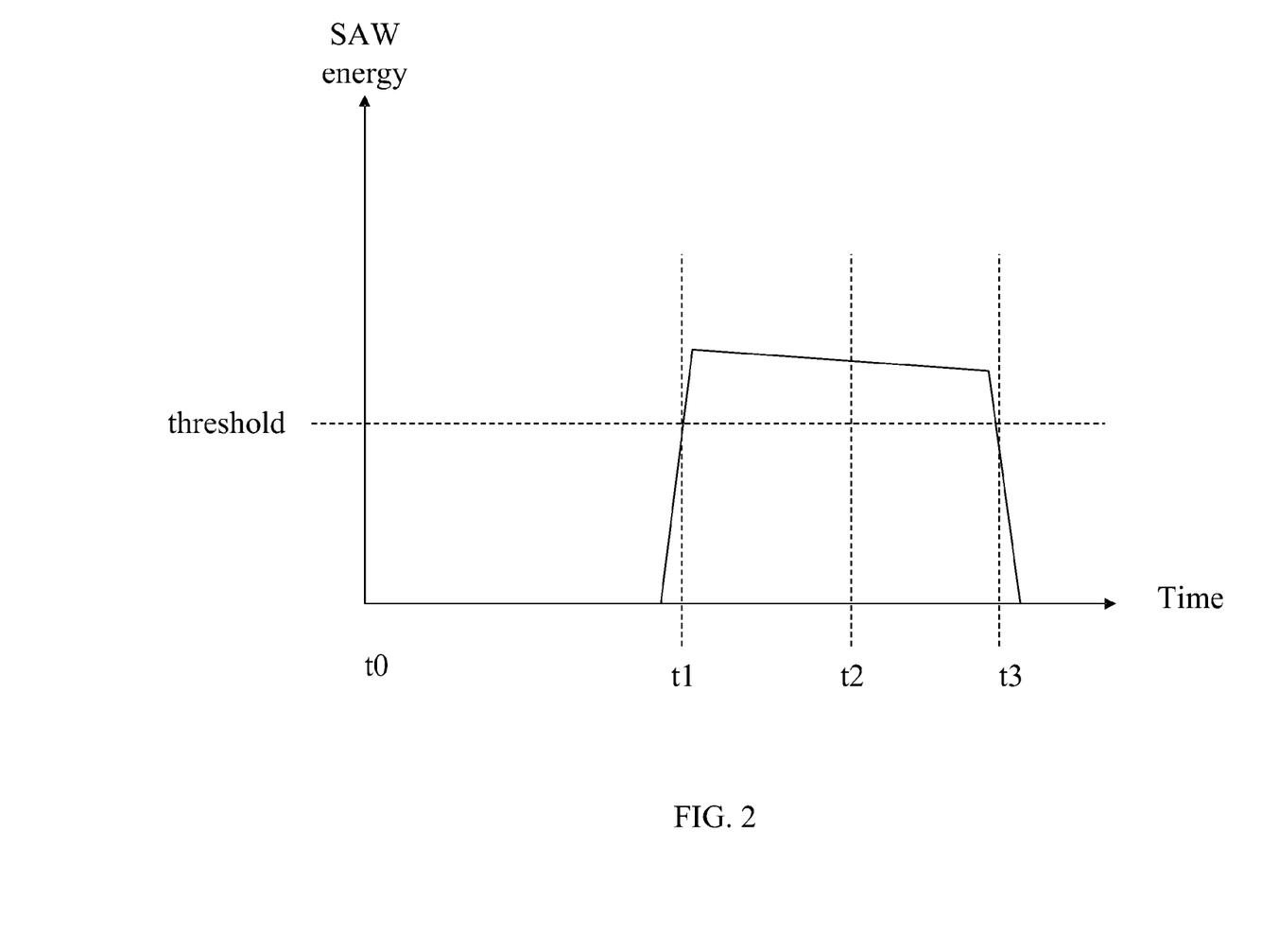
FIG. 2 is an acoustic wave receiving timing sequence diagram of a SAW receiver in accordance with an embodiment of the present invention.

Please refer to FIG. 2, which is an acoustic wave receiving timing sequence diagram of a SAW receiver in accordance with an embodiment of the present invention. The timing sequence may be generated by the receiver 134 or 144 shown in FIG. 1. The received surface acoustic waves are generated by corresponding transmitters 132 or 142. After receiving the energy carried by the surface acoustic waves, the receiver 134 or 144 converts the acoustic energy to electrical energy. Thus the timing sequence diagram could be generated by the processing apparatus 110 accordingly. And the size of touch sensitive area could be estimated. Details of estimation are elaborated below.

Please be noted that the exemplary timing sequence shown in FIG. 2 is just an example. The time axis and the acoustic energy (or signaling) axis may not be proportioned properly. Due to different conditions of various implementations, the timing sequences in practices may be different in proportion comparing to the diagram shown in FIG. 2.

Figure 3:
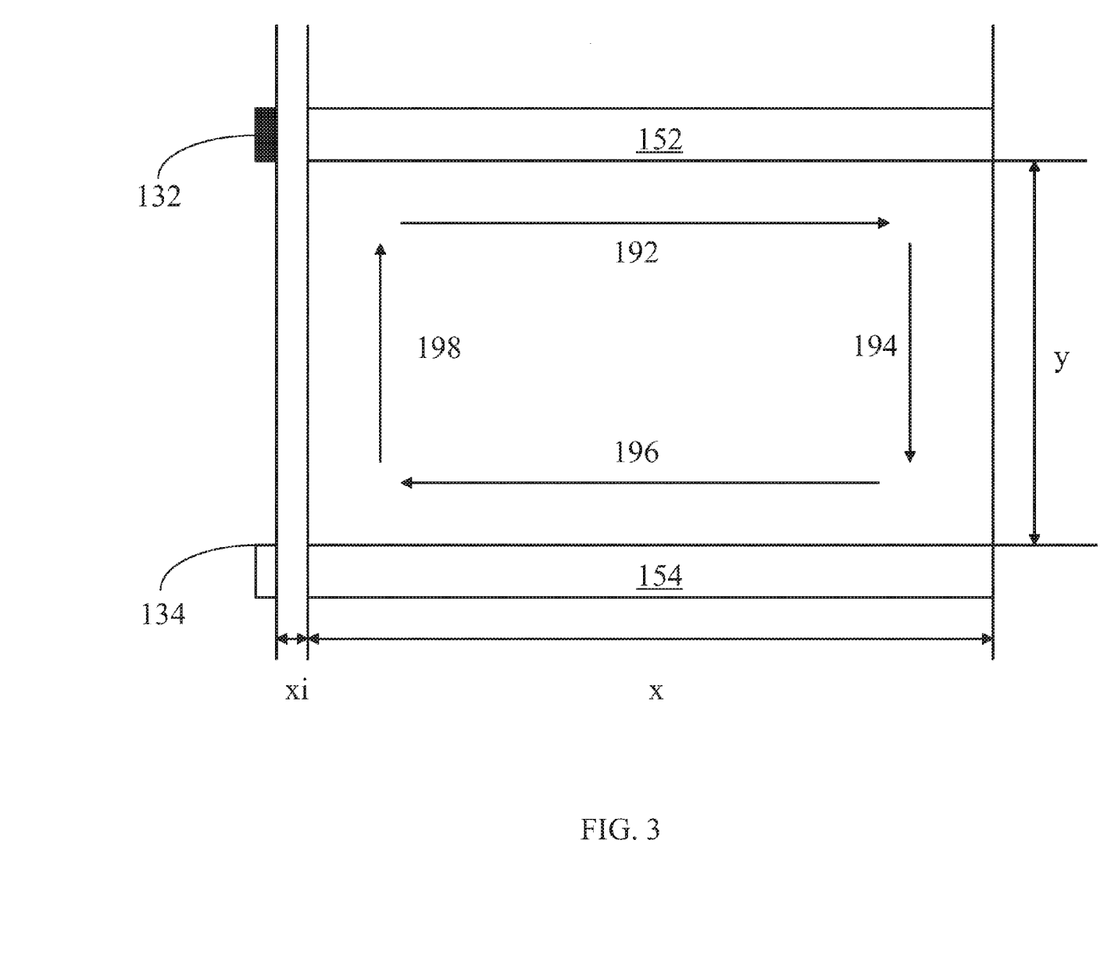
FIG. 3 is a schematic block diagram that illustrates a SAW sensor module in accordance with an embodiment of the present invention.

Please refer to FIG. 3, which is a schematic block diagram that illustrates a SAW sensor module 120 in accordance with an embodiment of the present invention. The components shown in FIG. 3 are basically analogous to the components shown in FIG. 1. Hence the same numerals are represented. In order to keep clearance, unnecessary components are not shown in FIG. 3. In one embodiment of the present invention, there is an initial gap or so-called an initial distance xi between the first transmitter 132 and the bar 152. The initial distance xi is defined as the minimum distance that the bar 152 is capable to reflect waves toward the direction 194 from the first transmitter 132 along the direction 194. A length x is the maximum distance that the bar 152 is capable to reflect waves from the direction 194 toward the direction 194. It is easily understood by people ordinary skilled in the art that the length x is exactly the length of the touch sensitive area.

As a result, the lengths of acoustic wave reflecting bars 152 and 154 are as the same as x. Besides, the distance between the first receiver 134 and the acoustic wave reflecting bar 154 is also the initial distance xi. Here, the initial distance xi is defined as the minimum distance that the bar 154 is capable to reflect waves toward the first receiver 134.

In one embodiment of the present invention, for the conveniences of production and calculation, the initial distance xi between the first transmitter 132 and the bar 152 equals to the initial distance xi between the first receiver 134 and the bar 154.

Please refer back to FIG. 2, the processing apparatus 110 commands the first transmitter 132 to transmit SAW at timing moment t0 and endure time td. People ordinary skilled in the art can understand the propagation velocity of SAW on homogenous surface of the substrate 122 is constant, said v. According to basic physics, distance is the product of velocity and time.

In one embodiment, the timing t0 is the exact moment that the first transmitter 132 begins to transmit SAW. In another embodiment, the timing t0 is the exact moment that the first receiver 134 receives an electromagnetic interference from the first transmitter 132. In this embodiment, the circuits from the first transmitter 132 and the first receiver 134 to the processing apparatus 110 are arranged nearby. At the moment that the processing apparatus 110 commands the first transmitter for transmission SAW, a large volume or a large voltage current is passed through the circuit from the processing apparatus 110 to the first transmitter 132. Since the circuits are arranged nearby, the circuit between the first receiver 134 and the processing apparatus 110 would be electromagnetic interfered accordingly. Thus, the processing apparatus 110 receives a signal from the first receiver 134. The moment is very approximately to the SAW transmission by the first transmitter 132. It could be taken as timing t0.

About at the first timing t1 shown in FIG. 2, the first receiver 134 receives SAW transmitted from the first transmitter 132. In one embodiment of the present invention, at the first timing t1, the energy of SAW received by the first receiver 134 exceeds a threshold. In practical, the processing apparatus 110 cannot measure the energy of SAW directly. The processing apparatus 110 relies on the first receiver 134 to convert acoustic energy to electrical energy. In other words, the first receiver is configured to convert the acoustic energy to voltage or current volume in most common examples. The processing apparatus 110 can be aware of the acoustic energy by translating the voltage of current volume.

Figure 4A:
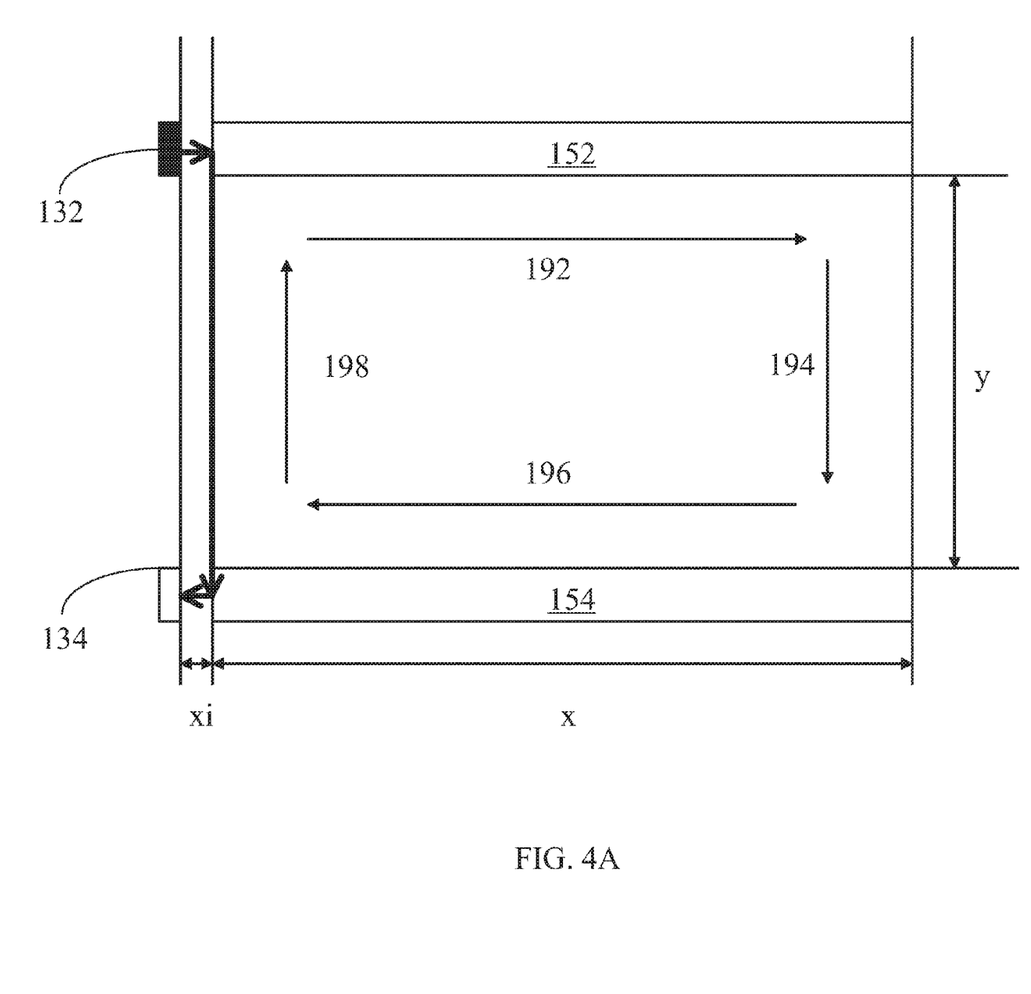
FIG. 4A is a diagram related to SAW propagation in accordance with an embodiment of the present invention.

Please refer to FIG. 4A, which is a diagram related to SAW propagation in accordance with an embodiment of the present invention. As shown in FIG. 4A, a SAW propagation path is represented by a black bold line. At first, SAW transmitted by the first transmitter 132 propagates across the initial distance xi along the direction 192. After that, SAW are reflected by the bar 154 toward the direction 194. Again, SAW are reflected by the bar 154 toward the direction 196 after propagating across the distance y. At last, SAW hit the first receiver 134 by traversing the initial distance xi. The propagating path represented by the black bold line is the shortest of all SAW propagating paths. Therefore, SAW transmitted by the first transmitter 132 at timing t0 arrive the first receiver 134 at timing t1. According to the fore-mentioned descriptions, the following formula (1) can be derived:

$$2*xi+y=v*t1 \qquad \text{formula (1)}$$

Figure 4B:
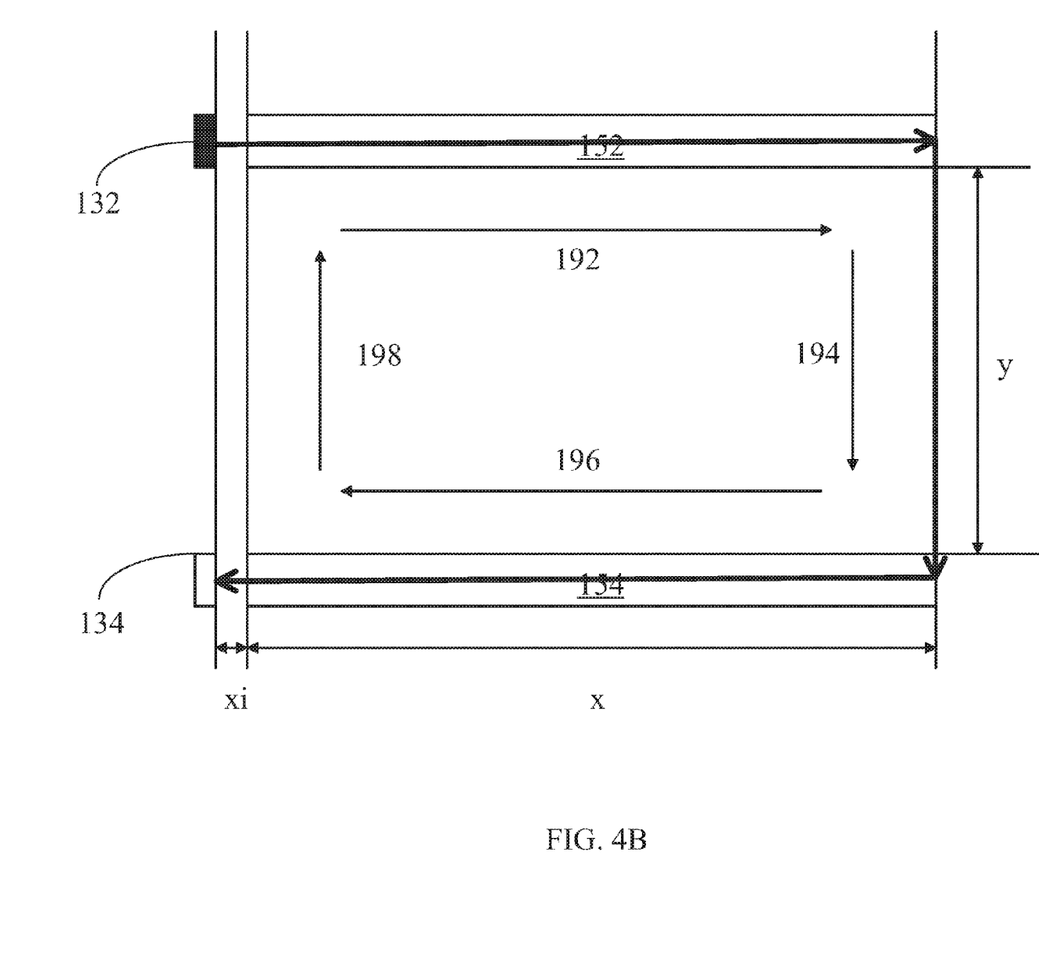
FIG. 4B is a diagram related to SAW propagation in accordance with an embodiment of the present invention.

Please refer to FIG. 4B, which is a diagram related to SAW propagation in accordance with an embodiment of the present invention. Similar with FIG. 4B, there is also a black bold line represents a SAW propagating path. The difference between the path shown in FIG. 4B and the path shown in FIG. 4A is that the path shown in FIG. 4B traverse the whole length x of the bar 152 as well as the whole length x of the bar 154. The first SAW traversing along the path arrives the first receiver 134 at the timing t2 shown in FIG. 2. According to the fore-mentioned description, the following formula (2) can be derived:

$$2*xi+2*x+y=v*t2 \qquad \text{formula (2)}$$

In the same way, the last SAW transmitted from the first transmitter 132 at the timing td along the path shown in FIG. 4B arrives the first receiver 134 at the timing t3 shown in FIG. 2. Since the transmission of the first transmitter 132 endures time period td, the timing difference between the first SAW arriving at timing t2 and the last SAW arriving at timing t3 along the path shown in FIG. 2 should be the same time period td. Therefore, the following formula (3) can be derived:

$$t2=t3-td \qquad \text{formula (3)}$$

With regard to the three formulas, the velocity v of SAW, the first timing t1, the third timing t3, and the time period td are known to the processing apparatus 110. The timing t2 is unknown to the processing apparatus 110. Hence, replacing t2 in formula (2) by formula (3) can derive the following formula (4):

$$2*xi+2*x+y=v*t3-v*td \qquad \text{formula (4)}$$

The following formula (5) can be derived by subtracting formula (1) from formula (4):

$$x=v*(t3-td-t1)/2 \qquad \text{formula (5)}$$

Already mentioned above, the four variables in the right side of the formula (5) are known. Hence the x-axis length x can be calculated by the processing apparatus 110.

In a similar way, if the processing apparatus does the same measurement to the second pair of transmitter 142 and receiver 144, the y-axis length y can be calculated. Please refer to FIG. 5, which is an acoustic wave receiving timing sequence diagram of the second SAW receiver 144 in accordance with an embodiment of the present invention.

Figure 5:
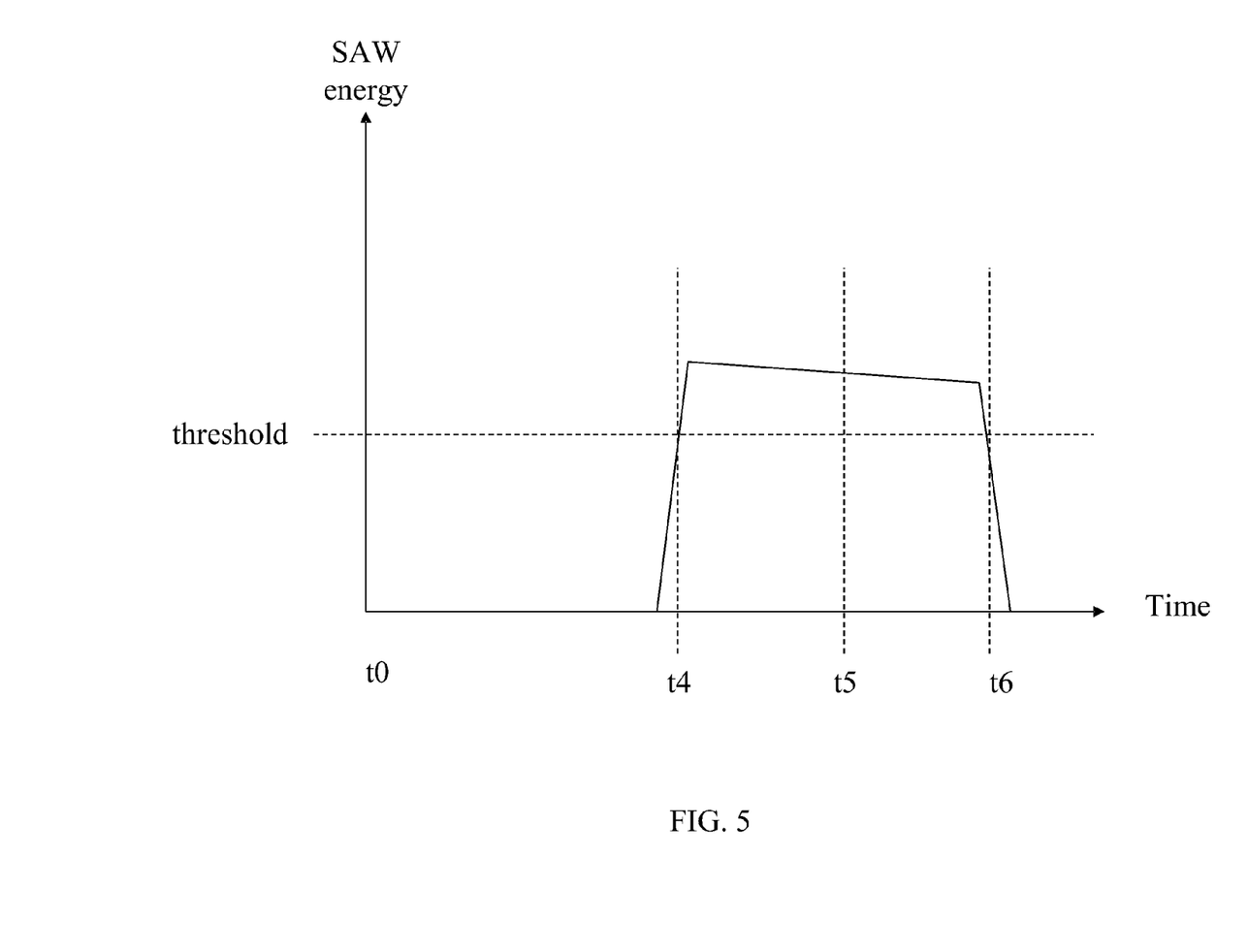
FIG. 5 is an acoustic wave receiving timing sequence diagram of the second SAW receiver in accordance with an embodiment of the present invention.

Similar with FIG. 2, the first SAW transmitted from the second transmitter 142 arrives the second receiver 144 at the fourth timing t4. The first SAW along the longest propagating path arrives the second receiver 144 at the fifth timing t5. After time period td, the last SAW along the longest propagating path arrives the second receiver 144 at the sixth timing t6.

There is another initial distance yi between the second transmitter 142 and the bar 156. Similarly, there is also the initial distance yi between the second receiver 144 and the bar 158.

Hence, using the same derivations, the following formulas could be concluded:

$$2*yi+x=v*t4 \qquad \text{formula (6)}$$

$$2*yi+2*y+x=v*t5 \qquad \text{formula (7)}$$

$$t5=t6-td \qquad \text{formula (8)}$$

$$2*yi+2*y+x=v*t6-v*td \qquad \text{formula (9)}$$

$$y=v*(t6-td-t4)/2 \qquad \text{formula (10)}$$

Since the processing apparatus 110 is known for the velocity v, the fourth timing t4, the sixth timing t6, and the time period td, the variables at the right side of formula (10) are known, the y-axis length y can be calculated accordingly. After the lengths x and y are calculated according to formula (5) and (10), respectively, these two lengths x and y are put into formula (1) and (2) for calculating the horizontal initial distance xi and vertical initial distance yi by the following formulas:

$$xi=(v*t1-v*(t6-td-t4)/2)/2 \qquad \text{formula (11)}$$

$$yi=(v*t4-v*(t3-td-t1)/2)/2 \qquad \text{formula (12)}$$

Because the processing apparatus 110 knows every variables at the right sides of formulas (11) and (12), the horizontal initial distance xi and the vertical initial distance yi can be calculated.

People ordinary skilled in the art can understand, both the first transmitter 132 and the second transmitter 142 convert electrical energy to SAW at the same duration time period td. Actually, these two transmitters 132 and 142 can use the same or different duration time period.

In one embodiment, assuming that the time period is very short and can be omitted, new formulas can be derived as:

$$x=v*(t3-t1)/2 \qquad \text{formula (13)}$$

$$y=v*(t6-t4)/2 \qquad \text{formula (14)}$$

$$xi=(v*t1-v*(t6-t4)/2)/2 \qquad \text{formula (15)}$$

$$yi=(v*t4-v*(t3-t1)/2)/2 \qquad \text{formula (16)}$$

In another embodiment, assuming the duration time period of SAW transmission of the first transmitter 132 is tdx and assuming the duration time period of SAW transmission of the second transmitter 142 is tdy. In case these two duration time periods tdx and tdy are not equaled, the formulas could be rewritten as:

$$x=v*(t3-tdx-t1)/2 \qquad \text{formula (17)}$$

$$y=v*(t6-tdy-t4)/2 \qquad \text{formula (18)}$$

$$xi=(v*t1-v*(t6-tdy-t4)/2)/2 \qquad \text{formula (19)}$$

$$yi=(v*t4-v*(t3-tdx-t1)/2)/2 \quad \text{formula (20)}$$

People ordinary skilled in the art can understand that the SAW sensor module 120 usually fits into one of several common sizes, e.g., 10.3 inch, 12 inch, 13.1 inch, 14 inch, and etc. The sizes of acoustic wave reflecting bars 152, 154, 156, and 158 are corresponding to the common sizes of the SAW sensor module 120.

In other words, there is a predetermined set of parameters corresponding to a common size. The predetermined set of parameters at last include the horizontal length x and the vertical length y of the touch sensitive area. Each of the predetermined set of parameters can additionally comprise the horizontal initial distance xi and the vertical horizontal initial distance yi. In one embodiment, each pair of the horizontal length x and the vertical length y can corresponds to one or more pairs of the horizontal initial distance xi and the vertical horizontal initial distance yi.

When the processing apparatus 110 does the calculations, a calculated set of the horizontal length x, the vertical length y, horizontal initial distance xi, and vertical initial distance yi of the touch sensitive area may not be identical to the predetermined set of parameters because of changes of SAW velocity, volumes of acoustic wave reflecting bars, or other conditions influenced by variations of temperature.

In one embodiment, the processing apparatus 110 may comprises a memory (not shown in FIG. 1.) In another embodiment, the processing apparatus 110 may be coupled to the memory. The memory comprises a plurality of sets of touch sensitive area parameters. Each set of parameters at least comprise the horizontal length x and the vertical length y of the touch sensitive area. Moreover, each set of parameters may further comprise one or more sets of the horizontal initial distance xi and the vertical initial distance yi.

After the processing apparatus 110 completes the calculations, it may compare with the calculated parameters and the plurality of sets of touch sensitive area parameters stored in the memory. In one embodiment, two parameters, the horizontal length x and the vertical length y of the touch sensitive area, are compared. In another embodiments, four parameters, the horizontal length x and the vertical length y as well as the horizontal initial distance xi and the vertical initial distance yi of the touch sensitive area, are compared. The absolute differences between the compared parameters are added to generate a total difference. The predetermined set of parameters corresponding to the minimum total difference is selected as the size of touch sensitive area of the system 100.

The processing apparatus 110 can record the selected set of parameters in a location of the memory. Each time the processing apparatus starts up, the location would be checked to determine whether there exists a set of parameter. In case, there exists the set of parameter, it means that the processing apparatus 110 already did the measurement. In case there is no any record in the location, the processing apparatus 110 would perform the measurement and the calculations. In one embodiment, the processing apparatus 110 records whatever it measures and calculates rather than the selected one from the plurality of predetermined sets.

People ordinary skilled in the art can understand that the horizontal length x and the vertical length y of the touch sensitive area can be calculated according to one of the following formula pairs: formulas (5) and (10), formulas (13) and (14), and formulas (17) and (18). In an optional step, one of a plurality of predetermined sets of touch sensitive area parameters is correlated to the calculated parameters. In other words, there are already multiple embodiments to support the following relationships: the horizontal length x is related to the SAW velocity v, the first timing t1, and the third timing t3; and the vertical length y is related to the SAW velocity v, the fourth timing t4, and the sixth timing t6. Similarly, the horizontal initial distance xi is related to the SAW velocity v, the fourth timing t4, and the sixth timing t6; and the vertical initial distance yi is related to the SAW velocity v, the first timing t1, and the third timing t3.

Figure 6:
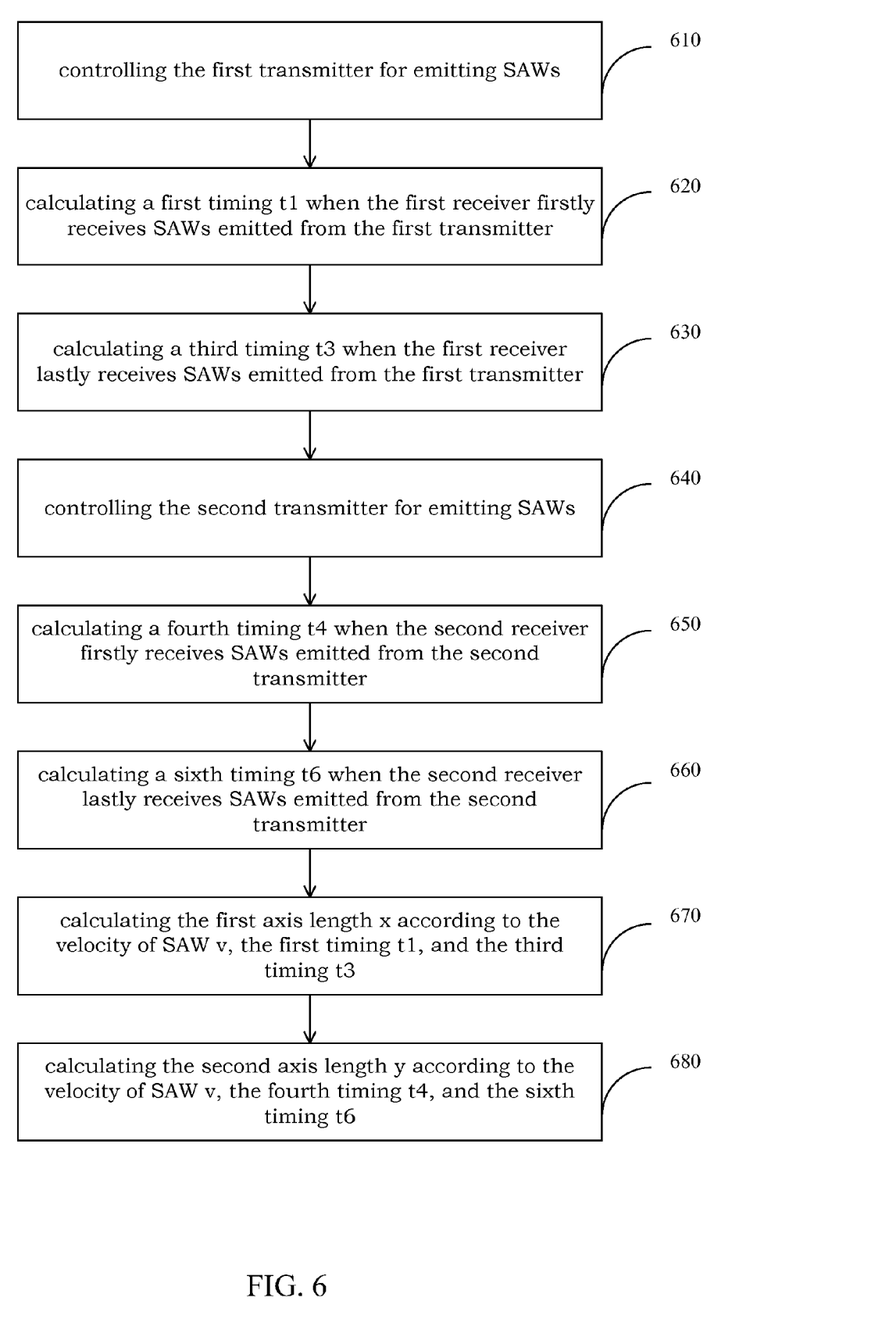
FIG. 6 is a flowchart diagram of a measurement method in accordance with an embodiment of the present invention.

Please refer to FIG. 6, which is a flowchart diagram of a measurement method in accordance with an embodiment of the present invention. The measurement method is configured to measure the touch sensitive area size of the SAW sensor module. The SAW sensor module comprises a substrate configured to propagate surface acoustic wave, a first transmitter and a first receiver corresponding to a first axis, and a second transmitter and a second receiver corresponding to a second axis. The SAW transmitted from the first transmitter at least propagate across a first initial distance xi, the length of the second axis y after reflected by a first acoustic wave reflecting bar, and again reflected by a second acoustic wave reflecting bar to the first receiver. The SAW transmitted from the second transmitter at least propagate across a second initial distance yi, the length of the first axis x after reflected by a third acoustic wave reflecting bar, and again reflected by a fourth acoustic wave reflecting bar to the second receiver.

The measurement method comprises the following steps: At first, at step 610, controlling the first transmitter for emitting SAWs. After that, at step 620, calculating a first timing t1 when the first receiver firstly receives SAWs emitted from the first transmitter. And at step 630, calculating a third timing t3 when the first receiver lastly receives SAWs emitted from the first transmitter.

In the same way, at step 640, controlling the second transmitter for emitting SAWs. After that, at step 650, calculating a fourth timing t4 when the second receiver firstly receives SAWs emitted from the second transmitter. And at step 660, calculating a sixth timing t6 when the second receiver lastly receives SAWs emitted from the second transmitter.

At last, at step 670, calculating the first axis length x according to the velocity of SAW v, the first timing t1, and the third timing t3. At step 680, calculating the second axis length y according to the velocity of SAW v, the fourth timing t4, and the sixth timing t6.

People ordinary skilled in the art can understand the execution orders between the steps 610, 620, 630, and 670 are constrained. In the same way, the execution orders between the steps 640, 650, 660, and 680 are also constrained. These two sets of execution orders are the limitations of the present invention with respect to the steps.

In one embodiment, the measurement method further comprises: calculating the first initial distance xi of the touch sensitive area according to the SAW velocity v, the fourth timing t4, and the sixth timing t6; and calculating the second initial distance yi of the touch sensitive area according to the SAW velocity v, the first timing t1, and the third timing t3. People ordinary skilled in the art can understand that there exists no execution order between these two steps.

In one embodiment, the first axis length x is related to v*(t3−t1)/2, the second axis length y is related to v*(t6−t4)/2. In another embodiment, the duration time period of the SAW transmissions from the first and the second transmitters is td, the first axis length x is related to v*(t3−td−t1)/2, the second axis length y is related to v*(t6−td−t4)/2. In an alternative embodiment, the duration time period of the SAW transmissions from the first transmitter is tdx, the duration time period of the SAW transmissions from the second transmitter is tdy, tdx does not equal to tdy, the first axis length x is related to $v*(t3-tdx-t1)/2$, the second axis length y is related to $v*(t6-tdy-t4)/2$.

In one embodiment, the processing apparatus 110 is coupled to a memory which comprises a plurality of sets of size parameters of touch sensitive area. After calculating the first axis length x and the second axis length y, the processing apparatus 110 compares the calculated lengths x and y with the plurality of sets and selects one set of parameters which are closest to the calculated lengths x and y from the plurality of sets.

In one embodiment, the measuring method performed by the processing apparatus 110 further comprises comparing the calculated first axis length x and second axis length y with a plurality of sets of size parameters of touch sensitive area and selecting one set of parameters which are closest to the calculated lengths x and y after the step of calculating the first axis length x and the second axis length y. In an alternative embodiment, the plurality of size parameters of touch sensitive area further comprises a first initial distance xi and a second initial distance yi. In another embodiment, the measuring method further comprises calculating the first initial distance xi of the touch sensitive area according to the SAW velocity v, the fourth timing t4, and the sixth timing t6; and calculating the second initial distance yi of the touch sensitive area according to the SAW velocity v, the first timing t1, and the third timing t3. The first and the second initial distances xi and yi of the selected set of size parameters which are closest to the calculated first and second initial distances xi and yi.

In one embodiment, the first axis is perpendicular to the second axis.

In another embodiment, at the first timing t1 and the fourth timing t4, the energy of SAW received by the first receiver and the second receiver from the first transmitter and the second transmitter exceeds a threshold, respectively; at the third timing t3 and the sixth timing t6, the energy of SAW received by the first receiver and the second receiver from the first transmitter and the second transmitter is below the threshold, respectively.

In a similar way, please refer to FIG. 1 again, the present invention provides a processing apparatus 110 which is configured to measure the size of a touch sensitive area of a SAW sensor module 120. The SAW sensor module 120 comprises a first transmitter 132 and a first receiver 134 corresponding to a first axis; and a second transmitter 142 and a second receiver 144 corresponding to a second axis.

The SAWs emitted from the first transmitter 132 traversed at least a first initial distance xi. The SAWs are reflected from a first SAW reflecting bar 152 to the touch sensitive area through a second axis length y. At final, the SAWs are reflected to the first receiver 134 by a second SAW reflecting bar 154. The SAWs emitted from the second transmitter 142 traversed at least a second initial distance xi. The SAWs are reflected from a third SAW reflecting bar 156 to the touch sensitive area through a first axis length x. At final, the SAWs are reflected to the received receiver 144 by a fourth SAW reflecting bar 158.

The processing apparatus 110 are coupled to the first transmitter 132, the first receiver 134, the second transmitter 142, and the second receiver 144. The processing apparatus 110 is configured to perform the steps shown in FIG. 6.

At the beginning step 610, commanding the first transmitter emitting SAWs. After that, at step 620, calculating a first timing t1 when the first receiver firstly receives the SAWs emitted from the first transmitter. At step 630, calculating a third timing t3 when the first receiver receives the last SAW emitted from the first transmitter.

In a similar way, at step 640, commanding the second transmitter emitting SAWs. After that at step 650, calculating a fourth timing t4 when the second receiver firstly receives the SAWs emitted from the second transmitter. At step 660, calculating a sixth timing t6 when the second receiver receives the last SAW emitted from the second transmitter.

Finally, at step 670, calculating the first axis length x of touch sensitive area according to the SAW velocity v, the first timing t1, and the third timing t3. Similarly, at step 680, calculating the second axis length y of touch sensitive area according to the SAW velocity v, the fourth timing t4, and the six timing t6.

People ordinary skilled in the art can understand that there exists a consequence relation between the steps 610, 620, 630, and 670. In the same way, there exists another consequence relation between the steps 640, 650, 660, and 680. These two consequence relations are the only limitations of the steps imposed by the present invention.

In one embodiment, the processing apparatus further executes the following steps: calculating the first initial distance xi according to the SAW velocity v, the fourth timing t4, and the sixth timing t6; and calculating the second initial distance yi according to the SAW velocity v, the first timing t1, and the third timing t3.

In one embodiment, the first axis length x is related to $v*(t3-t1)/2$, the second axis length y is related to $v*(t6-t4)/2$. In alternative embodiment, supposing the duration time period that the first and the second transmitters emit SAW is td, the first axis length x is related to $v*(t3-td-t1)/2$, the second axis length y is related to $v*(t6-td-t4)/2$. In another embodiment, supposing the duration time period that the first transmitter emits SAW is tdx, the duration time period that the second transmitter emits SAW is tdy, the first axis length x is related to $v*(t3-tdx-t1)/2$, the second axis length y is related to $v*(t6-tdy-t4)/2$.

In one embodiment, the first initial distance xi is related to $(v*t1-v*(t6-t4)/2)/2$, the second initial distance yi is related to $(v*t4-v*(t3-t1)/2)/2$. In alternative embodiment, supposing the duration time period that the first and the second transmitters emit SAW is td, the first initial distance xi is related to $(v*t1-v*(t6-td-t4)/2)/2$, the second initial distance yi is related to $(v*t4-v*(t3-td-t1)/2)/2$. In another embodiment, supposing the duration time period that the first transmitter emits SAW is tdx, the duration time period that the second transmitter emits SAW is tdy, the first initial distance xi is related to $(v*t1-v*(t6-tdy-t4)/2)/2$, the second initial distance yi is related to $(v*t4-v*(t3-tdx-t1)/2)/2$.

In one embodiment, the processing apparatus 110 is coupled to a memory which comprises a plurality of sets of size parameter of touch sensitive area. After calculating the first axis length x and the second axis length y, the processing apparatus 110 compares the calculated lengths x and y with the plurality of sets and selects one set of parameters which are closest to the calculated lengths x and y from the plurality of sets.

In one embodiment, the measuring method performed by the processing apparatus 110 further comprises comparing the calculated first axis length x and second axis length y with a plurality of sets of size parameters of touch sensitive area and selecting one set of parameters which are closest to the calculated lengths x and y after the step of calculating the first axis length x and the second axis length y. In an alternative embodiment, the plurality of size parameters of touch sensitive area further comprises a first initial distance xi and a second initial distance yi. In another embodiment, the measuring method further comprises calculating the first initial distance xi of the touch sensitive area according to the SAW velocity v, the fourth timing t4, and the sixth timing t6; and calculating the second initial distance yi of the touch sensitive area according to the SAW velocity v, the first timing t1, and the third timing t3. The first and the second initial distances xi and yi of the selected set of size parameters which are closest to the calculated first and second initial distances xi and yi.

In one embodiment, the first axis is perpendicular to the second axis.

In another embodiment, at the first timing t1 and the fourth timing t4, the energy of SAW received by the first receiver and the second receiver from the first transmitter and the second transmitter exceeds a threshold, respectively; at the third timing t3 and the sixth timing t6, the energy of SAW received by the first receiver and the second receiver from the first transmitter and the second transmitter is below the threshold, respectively.

The above embodiments are only used to illustrate the principle of the present invention, and they should not be construed as to limit the present invention in any way. The above embodiments can be modified by those with ordinary skill in the art without departing from the scope of the present invention as defined in the following appended claims.

What is claimed is:

1. A measuring method of touch sensitive area size of a surface acoustic wave (SAW) sensor module, wherein the SAW sensor module comprising a substrate configured for propagating SAW, a first transmitter and a first receiver corresponding to a first axis, a second transmitter and a second receiver corresponding to a second axis, the SAWs emitted by the first transmitter at least pass through a first initial distance xi, propagate through a second axis length y after reflected by a first SAW reflecting bar, and enter the first receiver after reflected by a second SAW reflecting bar, the SAWs emitted by the second transmitter at least pass through a second initial distance yi, propagate through a first axis length x after reflected by a third SAW reflecting bar, and enter the second receiver after reflected by a fourth SAW reflecting bar, the measuring method comprising:
controlling the first transmitter for emitting SAWs;
calculating a first timing t1 when the first receiver firstly receives SAWs emitted from the first transmitter;
calculating a third timing t3 when the first receiver lastly receives SAWs emitted from the first transmitter;
controlling the second transmitter for emitting SAWs;
calculating a fourth timing t4 when the second receiver firstly receives SAWs emitted from the second transmitter;
calculating a sixth timing t6 when the second receiver lastly receives SAWs emitted from the second transmitter;
calculating the first axis length x according to the velocity of SAW v, the first timing t1, and the third timing t3; and
calculating the second axis length y according to the velocity of SAW v, the fourth timing t4, and the sixth timing t6.

2. The measuring method of claim 1, further comprising:
calculating the first initial distance xi according to the velocity of SAW v, the fourth timing t4, and the sixth timing t6; and
calculating the second initial distance yi according to the velocity of SAW v, the first timing t1, and the third timing t3.

3. The measuring method of claim 2, wherein the first initial distance xi is related to $(v*t1-v*(t6-t4)/2)/2$, the second initial distance yi is related to $(v*t4-v*(t3-t1)/2)/2$.

4. The measuring method of claim 2, wherein the duration time period that the first and second transmitters emit SAW is td, wherein the first initial distance xi is related to $(v*t1-v*(t6-td-t4)/2)/2$, the second initial distance yi is related to $(v*t4-v*(t3-td-t1)/2)/2$.

5. The measuring method of claim 2, wherein the duration time period that the first transmitter emits SAW is tdx, wherein the duration time period that the second transmitter emits SAW is tdy, tdx does not equal to tdy, wherein the first initial distance xi is related to $(v*t1-v*(t6-tdy-t4)/2)/2$, the second initial distance yi is related to $(v*t4-v*(t3-tdx-t1)/2)/2$.

6. The measuring method of claim 1, wherein the first axis length x is related to $v*(t3-t1)/2$, and the second axis length y is related to $v*(t6-t4)/2$.

7. The measuring method of claim 1, wherein the duration time period that the first and second transmitters emit SAW is td, the first axis length x is related to $v*(t3-td-t1)/2$, and the second axis length y is related to $v*(t6-td-t4)/2$.

8. The measuring method of claim 1, wherein the duration time period that the first transmitter emits SAW is tdx, wherein the duration time period that the second transmitter emits SAW is tdy, tdx does not equal to tdy, the first axis length x is related to $v*(t3-tdx-t1)/2$, and the second axis length y is related to $v*(t6-tdy-t4)/2$.

9. The measuring method of claim 1, further comprising after said calculating the first axis length x and the second axis length y, comparing the calculated x and y with a plurality of sets of touch sensitive area size parameters and selecting one set from the plurality of sets of touch sensitive area size parameters, wherein a first length x and a second length y of the set are closest to the calculated axis length x and the second axis length y.

10. The measuring method of claim 9, wherein the plurality of sets of touch sensitive area size parameters further comprises the first initial distance xi and the second initial distance yi.

11. The measuring method of claim 10, further comprising:
calculating the first initial distance xi according to the velocity of SAW v, the fourth timing t4, and the sixth timing t6;
calculating the second initial distance yi according to the velocity of SAW v, the first timing t1, and the third timing t3;
wherein the first initial distance xi and the second initial distance yi of the selected set of parameters are closest to the calculated first initial distance xi and the second initial distance yi.

12. The measuring method of claim 1, wherein the first axis is perpendicular to the second axis.

13. The measuring method of claim 1, wherein when the first timing t1 and the fourth timing t4, the SAW energy received by the first receiver and the second receiver exceeds a threshold, respectively, wherein when the third timing t3 and the sixth timing t6, the SAW energy received by the first receiver and the second receiver are below the threshold, respectively.

14. A surface acoustic wave (SAW) touch sensitive system for measuring touch sensitive area size, comprising:
a SAW sensor module, comprising:

a first transmitter and a first receiver corresponding to a first axis;

a second transmitter and a second receiver corresponding to a second axis;

wherein the SAWs emitted by the first transmitter at least pass through a first initial distance xi, propagate through a second axis length y after reflected by a first SAW reflecting bar, and enter the first receiver after reflected by a second SAW reflecting bar, and the SAWs emitted by the second transmitter at least pass through a second initial distance yi, propagate through a first axis length x after reflected by a third SAW reflecting bar, and enter the second receiver after reflected by a fourth SAW reflecting bar;

a processing apparatus, coupled to the first transmitter, the first receiver, the second transmitter, and the second receiver, is configured to perform the following steps:

controlling the first transmitter for emitting SAWs;

calculating a first timing t1 when the first receiver firstly receives SAWs emitted from the first transmitter;

calculating a third timing t3 when the first receiver lastly receives SAWs emitted from the first transmitter;

controlling the second transmitter for emitting SAWs;

calculating a fourth timing t4 when the second receiver firstly receives SAWs emitted from the second transmitter;

calculating a sixth timing t6 when the second receiver lastly receives SAWs emitted from the second transmitter;

calculating the first axis length x according to the velocity of SAW v, the first timing t1, and the third timing t3; and calculating the second axis length y according to the velocity of SAW v, the fourth timing t4, and the sixth timing t6.

15. The SAW touch sensitive system of claim 14, wherein the processing apparatus is further configured to perform the following steps:

calculating the first initial distance xi according to the velocity of SAW v, the fourth timing t4, and the sixth timing t6; and calculating the second initial distance yi according to the velocity of SAW v, the first timing t1, and the third timing t3.

16. The SAW touch sensitive system of claim 15, wherein the first initial distance xi is related to $(v*t1-v*(t6-t4)/2)/2$, the second initial distance yi is related to $(v*t4-v*(t3-t1)/2)/2$.

17. The SAW touch sensitive system of claim 15, wherein the duration time period that the first and second transmitters emit SAW is td, wherein the first initial distance xi is related to $(v*t1-v*(t6-td-t4)/2)/2$, the second initial distance yi is related to $(v*t4-v*(t3-td-t1)/2)/2$.

18. The SAW touch sensitive system of claim 15, wherein the duration time period that the first transmitter emits SAW is tdx, wherein the duration time period that the second transmitter emits SAW is tdy, tdx does not equal to tdy, wherein the first initial distance xi is related to $(v*t1-v*(t6-tdy-t4)/2)/2$, the second initial distance yi is related to $(v*t4-v*(t3-tdx-t1)/2)/2$.

19. The SAW touch sensitive system of claim 14, wherein the first axis length x is related to $v*(t3-t1)/2$, and the second axis length y is related to $v*(t6-t4)/2$.

20. The SAW touch sensitive system of claim 14, wherein the duration time period that the first and second transmitters emit SAW is td, the first axis length x is related to $v*(t3-td-t1)/2$, and the second axis length y is related to $v*(t6-td-t4)/2$.

21. The SAW touch sensitive system of claim 14, wherein the duration time period that the first transmitter emits SAW is tdx, wherein the duration time period that the second transmitter emits SAW is tdy, tdx does not equal to tdy, the first axis length x is related to $v*(t3-tdx-t1)/2$, and the second axis length y is related to $v*(t6-tdy-t4)/2$.

22. The SAW touch sensitive system of claim 14, further comprising a memory coupled to the processing apparatus, wherein the memory comprises a plurality of sets of touch sensitive area size parameters, wherein the processing apparatus is further configured for comparing the calculated x and y with a plurality of sets of touch sensitive area size parameters and selecting one set from the plurality of sets of touch sensitive area size parameters after said calculating the first axis length x and the second axis length y, wherein a first length x and a second length y of the set are closest to the calculated axis length x and the second axis length y.

23. The SAW touch sensitive system of claim 22, wherein the plurality of sets of touch sensitive area size parameters further comprises the first initial distance xi and the second initial distance yi.

24. The SAW touch sensitive system of claim 23, wherein the processing apparatus is further configured to perform the following steps:

calculating the first initial distance xi according to the velocity of SAW v, the fourth timing t4, and the sixth timing t6;

calculating the second initial distance yi according to the velocity of SAW v, the first timing t1, and the third timing t3;

wherein the first initial distance xi and the second initial distance yi of the selected set of parameters are closest to the calculated first initial distance xi and the second initial distance yi.

25. The SAW touch sensitive system of claim 14, wherein the first axis is perpendicular to the second axis.

26. The SAW touch sensitive system of claim 14, wherein when the first timing t1 and the fourth timing t4, the SAW energy received by the first receiver and the second receiver exceeds a threshold, respectively, wherein when the third timing t3 and the sixth timing t6, the SAW energy received by the first receiver and the second receiver are below the threshold, respectively.

27. A processing apparatus for measuring size of a touch sensitive area of a surface acoustic wave sensor module, wherein the SAW sensor module comprising a substrate configured for propagating SAW, a first transmitter and a first receiver corresponding to a first axis, a second transmitter and a second receiver corresponding to a second axis, the SAWs emitted by the first transmitter at least pass through a first initial distance xi, propagate through a second axis length y after reflected by a first SAW reflecting bar, and enter the first receiver after reflected by a second SAW reflecting bar, the SAWs emitted by the second transmitter at least pass through a second initial distance yi, propagate through a first axis length x after reflected by a third SAW reflecting bar, and enter the second receiver after reflected by a fourth SAW reflecting bar, wherein the processing apparatus, coupled to the first transmitter, the first receiver, the second transmitter, and the second receiver, is configured to perform the following steps:

controlling the first transmitter for emitting SAWs;

calculating a first timing t1 when the first receiver firstly receives SAWs emitted from the first transmitter;

calculating a third timing t3 when the first receiver lastly receives SAWs emitted from the first transmitter;

controlling the second transmitter for emitting SAWs;

calculating a fourth timing t4 when the second receiver firstly receives SAWs emitted from the second transmitter;

calculating a sixth timing t6 when the second receiver lastly receives SAWs emitted from the second transmitter;

calculating the first axis length x according to the velocity of SAW v, the first timing t1, and the third timing t3; and calculating the second axis length y according to the velocity of SAW v, the fourth timing t4, and the sixth timing t6.

28. The processing apparatus of claim 27, wherein the processing apparatus is further configured to perform the following steps:

calculating the first initial distance xi according to the velocity of SAW v, the fourth timing t4, and the sixth timing t6; and calculating the second initial distance yi according to the velocity of SAW v, the first timing t1, and the third timing t3.

29. The processing apparatus of claim 28, wherein the first initial distance xi is related to (v*t1−v*(t6−t4)/2)/2, the second initial distance yi is related to (v*t4−v*(t3−t1)/2/2.

30. The processing apparatus of claim 28, wherein the duration time period that the first and second transmitters emit SAW is td, wherein the first initial distance xi is related to (v*t1−v*(t6−td−t4)/2)/2, the second initial distance yi is related to (v*t4−v*(t3−td−t1)/2/2.

31. The processing apparatus of claim 28, wherein the duration time period that the first transmitter emits SAW is tdx, wherein the duration time period that the second transmitter emits SAW is tdy, tdx does not equal to tdy, wherein the first initial distance xi is related to (v*t1−v*(t6−tdy−t4)/2)/2, the second initial distance yi is related to (v*t4−v*(t3−tdx−t1)/2/2.

32. The processing apparatus of claim 31, wherein the plurality of sets of touch sensitive area size parameters further comprises the first initial distance xi and the second initial distance yi.

33. The processing apparatus of claim 32, wherein the processing apparatus is further configured to perform the following steps:

calculating the first initial distance xi according to the velocity of SAW v, the fourth timing t4, and the sixth timing t6;

calculating the second initial distance yi according to the velocity of SAW v, the first timing t1, and the third timing t3;

wherein the first initial distance xi and the second initial distance yi of the selected set of parameters are closest to the calculated first initial distance xi and the second initial distance yi.

34. The processing apparatus of claim 27, wherein the first axis length x is related to v*(t3−t1)/2, and the second axis length y is related to v*(t6−t4)/2.

35. The processing apparatus of claim 27, wherein the duration time period that the first and second transmitters emit SAW is td, the first axis length x is related to v*(t3−td−t1)/2, and the second axis length y is related to v*(t6−td−t4)/2.

36. The processing apparatus of claim 27, wherein the duration time period that the first transmitter emits SAW is tdx, wherein the duration time period that the second transmitter emits SAW is tdy, tdx does not equal to tdy, the first axis length x is related to v*(t3−tdx−t1)/2, and the second axis length y is related to v*(t6−tdy−t4)/2.

37. The processing apparatus of claim 27, wherein the first axis is perpendicular to the second axis.

38. The processing apparatus of claim 27, wherein when the first timing t1 and the fourth timing t4, the SAW energy received by the first receiver and the second receiver exceeds a threshold, respectively, wherein when the third timing t3 and the sixth timing t6, the SAW energy received by the first receiver and the second receiver are below the threshold, respectively.

* * * * *